United States Patent [19]
Naganuma et al.

[11] Patent Number: 5,796,887
[45] Date of Patent: Aug. 18, 1998

[54] OPTICAL DEVICE FOR COUPLING AND SEPARATING TWO LIGHT COMPONENTS

[75] Inventors: Norihisa Naganuma, Sapporo; Hideki Noda, Kawasaki, both of Japan

[73] Assignee: Fujitsu Limited, Kawasaki, Japan

[21] Appl. No.: 825,444

[22] Filed: Mar. 20, 1997

[30] Foreign Application Priority Data

Jun. 6, 1996 [JP] Japan ................... 8-143917

[51] Int. Cl.$^6$ ............................................. G02B 6/26
[52] U.S. Cl. .................... 385/18; 385/16; 385/33; 385/31
[58] Field of Search .................... 385/18, 16, 15, 385/17, 19, 20, 24, 31, 25, 33

[56] References Cited

U.S. PATENT DOCUMENTS 4,519,670  5/1985  Spinner et al. ............. 385/33 X
4,824,200  4/1989  Isono et al. ................ 350/96.16
5,028,111  7/1991  Yumoto et al. ............. 350/96.18

FOREIGN PATENT DOCUMENTS 5-113520  5/1993  Japan .

Primary Examiner—Phan T. H. Palmer
Attorney, Agent, or Firm—Staas & Halsey

[57] ABSTRACT

An optical device including a lens and an optical thin film for coupling and separating two light components. First and second optical fibers are arranged on one side of the lens at symmetrical positions with respect to the optical axis of the lens, and the optical thin film and a third optical fiber are arranged on the other side of the lens. An isosceles triangular block is arranged to simultaneously move the first and second optical fibers to adjust an incident angle and an emerging angle of the light made incident to the optical thin film. Alternatively, a movable isosceles triangular prism having two oblique reflecting surfaces is arranged.

18 Claims, 5 Drawing Sheets

OPTICAL DEVICE FOR COUPLING AND SEPARATING TWO LIGHT COMPONENTS

BACKGROUND OF THE INVENTION

1. Field of the Invention

The present invention relates to an optical device for coupling a plurality of simplex light components having different wavelengths into a multiplex light component and separating a multiplex light component into a plurality of simplex light components. In particular, the present invention relates to an optical wave coupling and separating device which has less dependence on polarization of light and which can be fabricated in a smaller size.

2. Description of the Related Art

An optical wave coupling and separating device is provided for multiplexing simplex light components having different wavelengths transmitted through two transmission lines to output a multiplex light transmitted through a single transmission line and separating a multiplex light transmitted through a single transmission line to output simplex light components having different wavelengths. The optical wave coupling and separating device is necessary for coupling and separating two light components having different wavelengths in the field of optical communication using a wavelength multiplex system.

A band-pass filter can be used in the optical wave coupling and separating device for selecting wavelengths. The band-pass filter is preferably operable at a small incident angle so that a wavelength characteristics is less dependent on polarization of light and can be fabricated in a smaller size.

FIG. 5 in the attached drawings shows a conventional optical wave coupling and separating device. The optical device 100 comprises a casing 101, a common port 102, a $\lambda_1$ port 103, a $\lambda_2$ port 104, and an optical thin film 105, these elements being mounted to the casing 101. When the optical device is used as a wave separating device and a multiplex light including light components having wavelengths $\lambda_1$ and $\lambda_2$ is introduced from the common port 102, the light component having wavelength $\lambda_1$ is transmitted through the optical thin film 105 and output from the $\lambda_1$ port 103 and the light component having wavelength $\lambda_2$ is reflected by the optical thin film 105 and output from the $\lambda_2$ port 104. In addition, when the optical device is used as a wave coupling device, the light component having wavelength $\lambda_1$ is introduced from the $\lambda_1$ port 103, the light component having wavelength $\lambda_2$ is introduced from the $\lambda_2$ port 104, and a multiplex light including light components having wavelengths $\lambda_1$ and $\lambda_2$ is output from the common port 102. In this way, the optical device can be reversibly used, and the optical device is hereinbelow described as a wave separating device.

The common port 102 includes a ferrule 111 having an end portion of an optical fiber 110 through which a light is transmitted, and a lens 112 which converts the light transmitted through the optical fiber 110 into a collimated parallel beam which travels through air to the optical thin film 105. The $\lambda_1$ port 103 has an identical construction to that of the common port 102 so that the light passing though the optical thin film 105 is converged by a lens 113 and introduced into an optical fiber 114. The $\lambda_2$ port 104 has an identical construction to that of the common port 102 so that the light reflected by the optical thin film 105 is converged by a lens 115 and introduced into an optical fiber 116.

The optical thin film 105 comprises a plurality of dielectric layers and acts as a narrow band-pass filter for the transmitted light $\lambda_1$ and the reflected light $\lambda_2$ when the multiplex light is made incident to the optical thin film 105 at a particular incident angle. In this case, the relationship between the transmitted light $\lambda_1$ and the incident angle (and the relationship between the reflected light $\lambda_2$ and the incident angle) is predetermined for a particular optical thin film 105. Therefore, it is possible to output the light having the desired wavelength $\lambda_1$ from the $\lambda_1$ port 103, by determining the inclination of the optical thin film 105 relative to the casing 101, and it is possible to output the light having the wavelength $\lambda_2$ from the $\lambda_2$ port 104, by appropriately determining the path separating angle $\theta_2$ which is the sum of the incident angle and the reflected angle, by adjusting the position of the $\lambda_2$ port 104. The optical device 100 can thus function as a wave separating device having the feature of a two-wavelength band-pass filter.

In the wavelength multiplex communication system expected for a next generation optical communication system, optical signals comprising two or more light components having wavelengths spaced apart 0.8 to 1 nm therebetween are sent and received. On this occasion, a band-pass filter having a narrow pass region is preferably used in order to prevent the light components having different wavelength from leaking.

In the case where a band-pass filter having a narrow passing region comprises an optical thin film, which is fabricated by vapor deposition process, there will be a manufacturing error in this process so it will be difficult to construct the optical device so that a desired passing region is ensured even if the optical thin film is arranged at the designated incident angle. Therefore, it is necessary to construct the optical device so that an incident angle of the optical thin film is adjustable so as to obtain a desired pass region. In FIG. 5, the broken line A indicates an optical path including the $\lambda_2$ port 104 for the reflected light when the incident angle is varied. The path separating angle is changed from $\theta_2$ to $\theta_1$. When the path separating angle become greater in this way, the size of the casing 101 of the optical wave coupling and separating device becomes greater.

In addition, the optical thin film comprising the band-pass filter made by a plurality of dielectric layers has a wavelength characteristic which depends on polarization of light. The incident angle is proportional to the dependence on polarization of light, so it is not preferable that the optical thin film has a greater incident angle, in order to reduce dependence on polarization of light.

In the case where the incident angle is small, the path separating angle is small. In this case, it is necessary to extend the optical path in the optical wave coupling and separating device to enlarge the space between the common port and the $\lambda_2$ port. Therefore, the size of the optical wave coupling and separating device becomes greater.

SUMMARY OF THE INVENTION

The object of the present invention is to solve the above described problems and to provide an optical device including an optical thin film comprising a band-pass filter having a narrow passing region in which the distance between the wavelengths is narrow, which device can be fabricated in a smaller size even if the incident angle is smaller to mitigate dependence on polarization of light.

According to the present invention, there is provided an optical device comprising a lens having an optical axis and a focal point, first and second parallel optical fibers arranged on one side of the lens at symmetrical positions with respect to the optical axis, a first support element for supporting the first optical fiber, a second support element for supporting the second optical fiber, an optical thin film arranged on the other side of the lens at a position of the focal point of the lens and perpendicular to the optical axis, a third optical fiber arranged on the opposite side of the lens from the optical thin film at a position on an optical path passing through the first optical fiber, the lens and the optical thin film, a third support element for supporting the third optical fiber, and whereby two light components can be transmitted through the first optical fiber, one of the two light components can be reflected by the optical thin film toward the second optical fiber and transmitted through the second optical fiber, and the other of the two light components can pass through the optical thin film toward the third optical fiber and transmitted through the third optical fiber.

Preferably, the first and second support elements are movably arranged so that the first and second optical fibers can be moved to symmetrical positions with respect to the optical axis to adjust angles of the transmitted light components made incident to the optical thin film.

Preferably, the device further comprises a moving element which moves the first and second support elements to adjust the angles of the transmitted light components made incident to the optical thin film.

Preferably, the device further comprises a guide to allow the first and second support elements to be moved in the direction parallel to the optical axis of the lens and to restrict the movement of the first and second support elements in the direction along the optical axis of the lens.

Preferably, wherein the moving element comprises a triangular block having an isosceles triangular cross section having a central axis, the moving element being movable with the central axis thereof in alignment with the optical axis of the lens so that the first and second support elements are moved equidistantly from the optical axis of the lens.

Preferably, the device further comprises a condensing lens between the lens and the third optical fiber. The condensing lens and the third optical fiber are preferably supported by a common support element.

Preferably, the device further comprises a micrometer to move the moving element.

In another aspect of the present invention, an optical device comprises a lens having an optical axis and a focal point, first and second optical fibers arranged on one side of the lens perpendicular to the optical axis of the lens at symmetrical positions with respect to the optical axis in a mutually facing relationship, an optical thin film arranged on the other side of the lens at a position of the focal point of the lens and perpendicular to the optical axis, a movable block having a central axis and two oblique surfaces symmetrically extending with respect to the central axis thereof, the oblique surfaces being reflecting surfaces, the movable block being movable with the central axis thereof in alignment with the optical axis of the lens to adjust angles of the transmitted light components made incident to the optical thin film, a third optical fiber arranged on the opposite side of the lens from the optical thin film at a position on an optical path passing through the first optical fiber, the reflecting surface, the lens and the optical thin film, and whereby two light components can be transmitted through the first optical fiber, one of the two light components can be reflected by the optical thin film toward the second optical fiber and be transmitted through the second optical fiber, and the other of the two light components can pass through the optical thin film toward the third optical fiber and be transmitted through the third optical fiber.

Preferably, the movable block comprises a triangular prism.

Preferably, the device further comprises a micrometer to move the movable block.

Preferably, the device further comprises a condensing lens between the lens and the third optical fiber. The condensing lens and the third optical fiber are preferably supported by a common support element.

In a further aspect of the present invention, an optical device comprises a lens having an optical axis, a first optical fiber arranged on one side of the lens to define a first optical path through the lens, a second optical fiber arranged on one side of the lens to define a second optical path through the lens, the first and second optical fibers being arranged at symmetrical positions with respect to the optical axis; the first optical path intersecting the second optical path at an intersecting position on the other side of the lens, an optical thin film arranged on the other side of the lens at the intersecting position perpendicular to the optical axis, a third optical fiber arranged on the opposite side of the lens from the optical thin film at a position on the first optical path, and whereby two light components can be transmitted through the first optical fiber, one of the two light components can be reflected by the optical thin film toward the second optical fiber and be transmitted through the second optical fiber, and the other of the two light components can pass through the optical thin film toward the third optical fiber and be transmitted through the third optical fiber.

The present invention further provides an optical amplifier including the optical device having the features described above.

The present invention further provides an optical communication system including the optical device having the features described above.

BRIEF DESCRIPTION OF THE DRAWINGS

The present invention will become more apparent from the following description of the preferred embodiments, with reference the accompanying drawings, in which.

DESCRIPTION OF THE PREFERRED EMBODIMENTS

Figure 1:
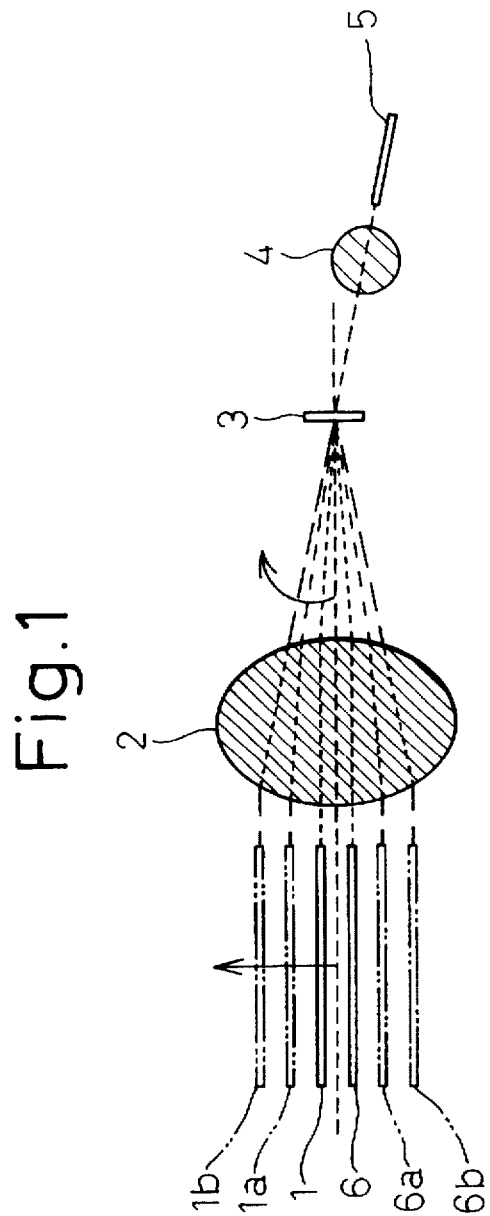
FIG. 1 s a diagrammatic view of the optical device according to the first embodiment of the present invention.

FIG. 1 shows the optical device according to the first embodiment of the present invention. The optical device comprises a first optical fiber 1 functioning as a common port, a collimating lens 2, an optical thin film 3, a condensing lens 4, a second optical fiber 6 functioning as a $\lambda_2$ port, and a third optical fiber 5 functioning as a $\lambda_1$ port 103.

The optical device can be used as a wave coupling and separating device, but the optical device is hereinbelow described as a wave separating device. When the optical device is used as a wave separating device, a multiplex light including light components having wavelengths $\lambda_1$ and $\lambda_2$ is introduced from the first optical fiber 1 to the lens 2. The light component having wavelength $\lambda_1$ is transmitted through the lens 2 and the optical thin film 3 to the third optical fiber 5 via the condensing lens 4. The light component having wavelength $\lambda_2$ is transmitted through the lens 2 and reflected by the optical thin film 3, and is then introduced in the second optical fiber 6 via the lens 2.

The lens 2 is a convex lens of any type which has an optical axis and a focal point. The first and second optical fibers 1 and 6 are arranged on one side of the lens parallel to each other and at symmetrical positions with respect to the optical axis of the lens 2. The optical thin film 3 is arranged on the other side of the lens 2 at a position at which the first optical path passing through the first optical fiber 1 and the lens 2 intersects the second optical path passing through the second optical fiber 6 and the lens 2, i.e., at a position of the focal point of the lens 2. The optical thin film 3 extends perpendicular to the optical axis of the lens 2.

The condensing lens 4 and the third optical fiber 5 are arranged on the opposite side of the lens 2 from the optical thin film 3 at a position on the optical path passing through the first optical fiber 1, the lens 2 and the optical thin film 3.

The incident angle of the light transmitted through the first optical fiber 1 and the lens 2 to the optical thin film 3 is identical to the incident angle of the light transmitted through the second optical fiber 6 and is the lens 2 to the optical thin film 3, and the respective incident angle corresponds to the reflection angle of the light reflected by the optical thin film 3. This is also applied to the case where the first and second optical fibers 1 and 6 are symmetrical but not parallel to each other.

This relationship is maintained when the first and second optical fibers 1 and 6 are moved symmetrically with respect to the optical axis of the lens 2. For example, this relationship is maintained when the first and second optical fibers 1 and 6 are at positions shown by the solid lines, at positions 1a and 1b, and at positions 1b and 6b.

The path separating angle is the sum of the incident angle and the reflection angle at the optical thin film 3. According to the present invention, the path separating angle is defined by the optical paths in the range within the lens 2 and the optical thin film 3, and is not dependent on the angle between the first and second optical fibers 1 and 6. Therefore, it is not necessary to increase the spacing between the first and second optical fibers 1 and 6 when it is desired to increase the path separating angle, and it is not necessary to increase the length of the optical paths between optical thin film 3 and the first and second optical fibers 1 and 6 when it is desired to reduce the path separating angle. Therefore, it is possible to fabricate the optical device in a small size. In addition, it is possible to easily adjust the path separating angle by simultaneously moving the first and second optical fibers 1 and 6, if a manufacturing error occurs in the optical thin film 3.

Figure 2:
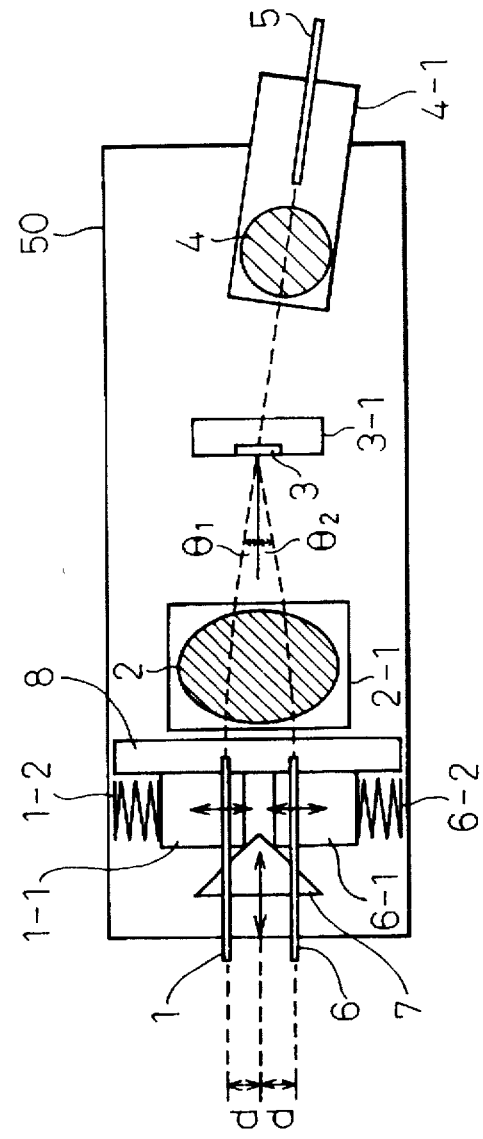
FIG. 2 is a diagrammatic view of the optical device according to the second embodiment of the present invention.

FIG. 2 shows the optical device according to the second embodiment of the present invention. The elements similar to those of the embodiment of FIG. 1 are shown by identical reference numerals. That is, the optical device comprises a first optical fiber 1, a lens 2, an optical thin film 3, a condensing lens 4, a second optical fiber 6, and a third optical fiber 5. The detailed descriptions of these elements are omitted here.

In FIG. 2, the optical device comprises a casing 50, and support dies 1—1, 2-1, 3-1, 4-1 and 6-1, arranged in the casing 50, to secure the first optical fiber 1, the lens 2, the optical thin film 3, the condensing lens 4, and the second optical fiber 6. The third optical fiber 5 is supported by the support die 4-1 along with the condensing lens 4, to constitute a fiber-lens assembly. The optical fibers 1, 5 and 6 can be fixed to the support dies 1—1, 4-1 and 6-1 by adhesive or soldering. The support dies 1—1, 4-1 and 6-1 can have a V-shaped groove on the surface thereof to secure the optical fibers therein. It will be understood that the support dies 1—1, 2-1, 3-1, 4-1 and 6-1 can be also provided in the embodiment of FIG. 1. The support die 2-1 supporting the lens 2 is welded to the casing 50.

A guide 8 is arranged in the casing 50 to allow the first and second support dies 1—1 and 6-1 to be moved in the direction parallel to the optical axis of the lens 2 and to restrict the movement of the first and second support dies 1—1 and 6-1 in the direction along the optical axis of the lens 2. The first and second support dies 1—1 and 6-1 are biased by springs 1-2 and 6-2, respectively toward the optical axis of the lens 2.

A triangular block 7 is arranged in the casing 50 to move the first and second support dies 1—1 and 6-1 to thereby move the first and second optical fibers 1 and 6 to adjust angles of the light components made incident to the optical thin film 3, in a manner described above. The triangular block 7 has an isosceles triangular cross section having a central axis, and the oblique sides thereof are brought in sliding contact with the first and second support dies 1—1 and 6-1, against the springs 1-2 and 6-2.

The triangular block 7 is movable with the central axis thereof in alignment with the optical axis of the lens 2 toward and away from the lens 2 so that the first and second support dies 1—1 and 6-1 are moved equidistantly from the optical axis of the lens 2, as shown by the arrows in FIG. 2.

When the triangular block 7 is moved toward the lens 2, the first and second support dies 1—1 and 6-1 are moved outward by the oblique sides of the triangular block 7 along the guide 8 while maintaining the equidistant relationship between the respective optical fibers 1 and 6 and the optical axis of the lens 2. When the triangular block 7 is moved away from the lens 2, the first and second support dies 1—1 and 6-1 are moved inward by the springs 1-2 and 6-2 along the guide 8 while maintaining the equidistant relationship between the respective optical fibers 1 and 6 and the optical axis of the lens 2. Preferably, it is possible to fabricate the triangular block 7 and the guide 8 from glass and to polish the sliding surfaces to provide for a smooth sliding movement.

In adjusting the incident angle, the triangular block 7 is moved to move the first and second optical fibers 1 and 6, so that the light passing through the first optical fiber 1 and the lens 2 is made incident to the optical thin film 3 at an incident angle, and the light is transmitted through the optical thin film 3 and the condensing lens 4 to the third optical fiber 5 until a light component having a predetermined wavelength $\lambda_1$ is transmitted to the third optical fiber 5. Thus, a desired incident angle $\theta_1$ necessary to provide a desired wavelength characteristic is realized. The support dies 1—1 and 6-1 are fixed to the casing 50 by welding or the like, and the first optical fiber 1 may be brought into a position of a distance "d" from the optical axis of the lens 2. The distance "d" from the first and second the optical fibers 1 and 6 to the optical axis of the lens 2 is thus determined.

Therefore, a light component having a predetermined wavelength $\lambda_1$ is most effectively transmitted through the optical thin film 3 and the condensing lens 4 to the third optical fiber 5. The position of the support die 4-1 is also determined in this step and the support die 4-1 is then fixed to the casing 50 to fix the third optical fiber 5. The method of fixing the optical axis of the fiber-lens assembly to the casing 50 is preferably conducted according to the method disclosed in Japanese Unexamined Patent Publication (Kokai) No. 5-113520, filed by the same inventors as those of the present case, under the title of JOINT UNIT OF OPTICAL ELEMENT, in which a spherical surface is interposed between the fiber-lens assembly and the casing to allow at least an adjustment of a relative angular position between them.

When these elements are positioned in this manner, the reflection angle $\theta_2$ at the optical thin film 3 corresponds to a light component having a wavelength $\lambda_2$, which is made incident to the second optical fiber 6 via the lens 2.

In this way, according to the arrangement of FIG. 2, it is possible to realize a wave separating device for two light components. According to this embodiment, it is not necessary to change the angle of the optical thin film 3 while the incident angle is adjusted, so it is possible to obtain the optical device having a simpler construction. In addition, it is possible to design the casing of the optical device in a smaller size even when the path separating angle becomes larger, because the optical fibers 1 and 6 can be moved symmetrically with respect to the optical axis of the lens. It will be apparent that the optical device of FIG. 2 can also be used as a wave coupling device.

Figure 3:
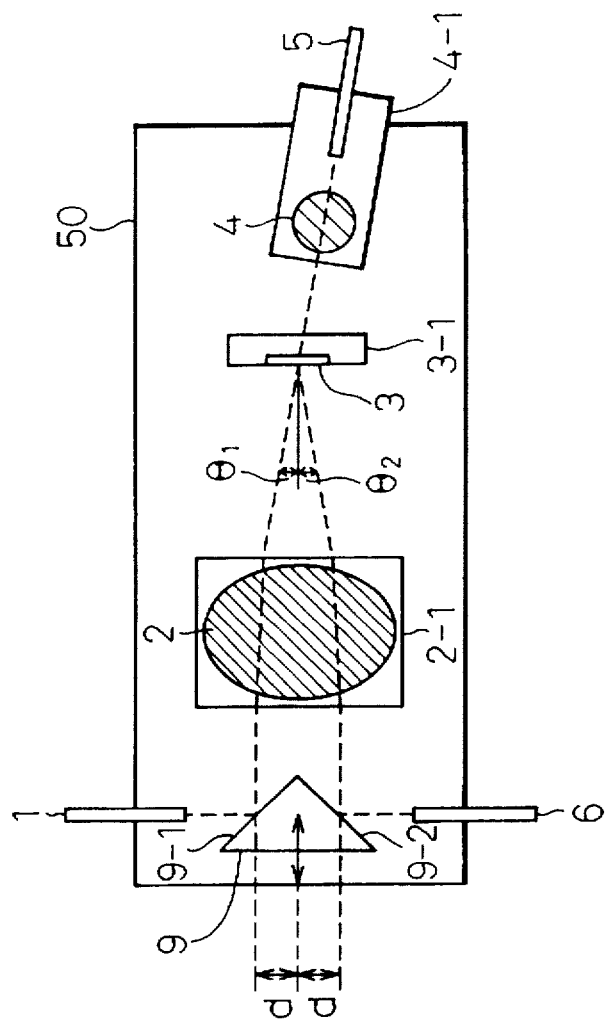
FIG. 3 is a diagrammatic view of the optical device according to the third embodiment of the present invention.

FIG. 3 shows the optical device according to the third embodiment of the present invention. The elements similar to those of the embodiments of FIGS. 1 and 2 are shown by the identical reference numerals. That is, the optical device comprises a first optical fiber 1, a lens 2, an optical thin film 3, a condensing lens 4, a second optical fiber 6, and a third optical fiber 5. The lens 2 is secured by the support die 2-1 in the casing 50, the optical thin film 3 is secured by the support die 3-1, and the third optical fiber 5 and the condensing lens 4 are supported by the support die 4-1. The detailed description of these elements are omitted here.

In FIG. 3, the first optical fiber 1 and the second optical fiber 6 are fixed to the casing 50 by any suitable support elements, such as the support dies or ferrules. The first optical fiber 1 and the second optical fiber 6 are arranged on one side of the lens 2 perpendicular to the optical axis of the lens 2 at symmetrical positions with respect to the optical axis of the lens 2 in a mutually facing relationship.

A triangular prism 9 is movably arranged in the casing 50. The triangular prism 9 has two oblique surfaces 9-1 and 9-2 symmetrically extending with respect to the central axis of the triangular block 9 and acting as total reflecting surfaces. The first optical fiber 1 and the second optical fiber 6 are arranged such that light components emerging therefrom travel toward the oblique surfaces 9-1 and 9-2. Thus, light components transmitted through the first optical fiber 1 and the second optical fiber 6 are reflected by the oblique surfaces 9-1 and 9-2 to and travel in parallel to the optical axis of the lens 2 toward the lens 2, and vice versa. The triangular prism 9 is movable with the central axis thereof in alignment with the optical axis of the lens 2 toward and away from the lens 2 to adjust angles of the light components made incident to the optical thin film 3 via the lens 2.

When the triangular prism 9 is moved toward the lens 2, the reflecting points on the oblique surfaces 9-1 and 9-2 are moved away from the apex of the triangular prism 9, so the courses of the light made incident to the lens 2 and the light emerging from the lens 2 are moved outward while maintaining the equidistant relationship between the respective courses of the light. When the triangular prism 9 is moved away from the lens 2, the reflecting points on the oblique surfaces 9-1 and 9-2 are moved toward the apex of the triangular prism 9, so the courses of the light made incident to the lens 2 and the light emerging from the lens 2 are moved inward while maintaining the equidistant relationship between the respective courses of the light.

Therefore, by moving the triangular prism 9 so that the light transmitted through the first optical fiber 1 and the lens 2 is made incident to the optical thin film 3 at an incident angle and is transmitted through the optical thin film 3 and the condensing lens 4 to the third optical fiber 5 until a light component having a predetermined wavelength $\lambda_1$ is transmitted to the third optical fiber 5. Thus, a desired incident angle $\theta_1$ necessary to provide a desired wavelength characteristic is realized. The triangular prism 9 is fixed to the casing 50 when the course of the light reflected by the triangular prism 9 is brought into a position of a distance d from the optical axis of the lens 2.

Therefore, a light component having a predetermined wavelength $\lambda_1$ is most effectively transmitted through the optical thin film 3 and the condensing lens 4 to the third optical fiber 5. The position of the support die 4-1 is also determined in this step and the support die 4-1 is fixed to the casing 50 to fix the position of the third optical fiber 5.

When these elements are positioned in this manner, the reflecting angle $\theta_2$ at the optical thin film 3 corresponds to a light component having a wavelength $\lambda_2$, which is made incident to the second optical fiber 6 via the lens 2.

In this way, it is possible to realize a wave separating device for two light components. According to this embodiment, it is not necessary to change the angle of the optical thin film 3 while the incident angle is adjusted, so it is possible to obtain an optical device having a simpler construction. In addition, it is possible to design the casing of the optical device in a smaller size even when the path separating angle becomes larger because the optical fibers 1 and 6 can be moved symmetrically with respect to the optical axis of the lens. It will be apparent that the optical device of FIG. 2 can also be used a wave coupling device.

Figure 4:
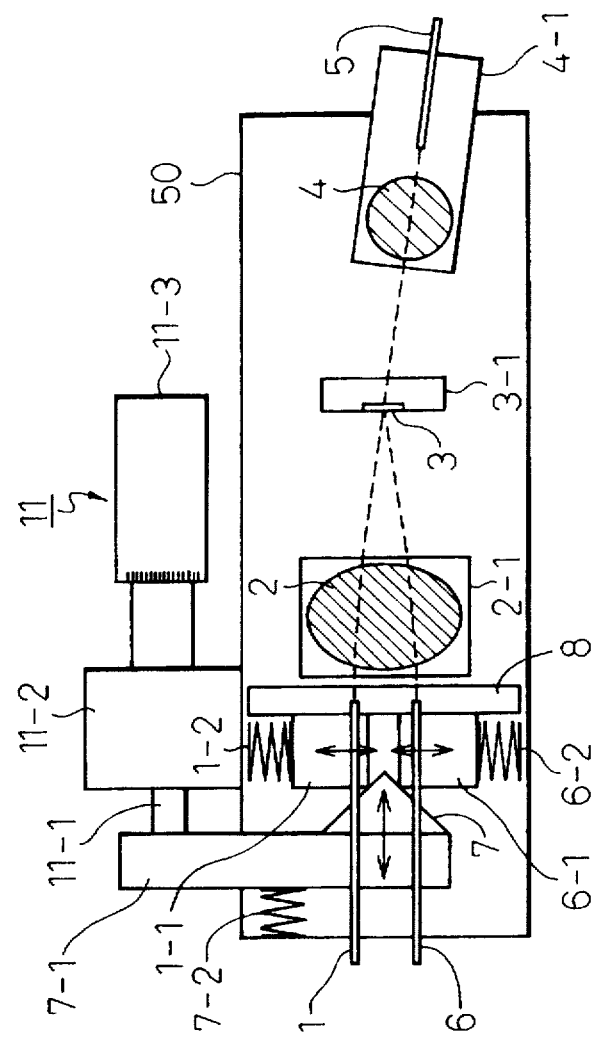
FIG. 4 is a view of the optical device according to the fourth embodiment of the present invention.
Figure 5:
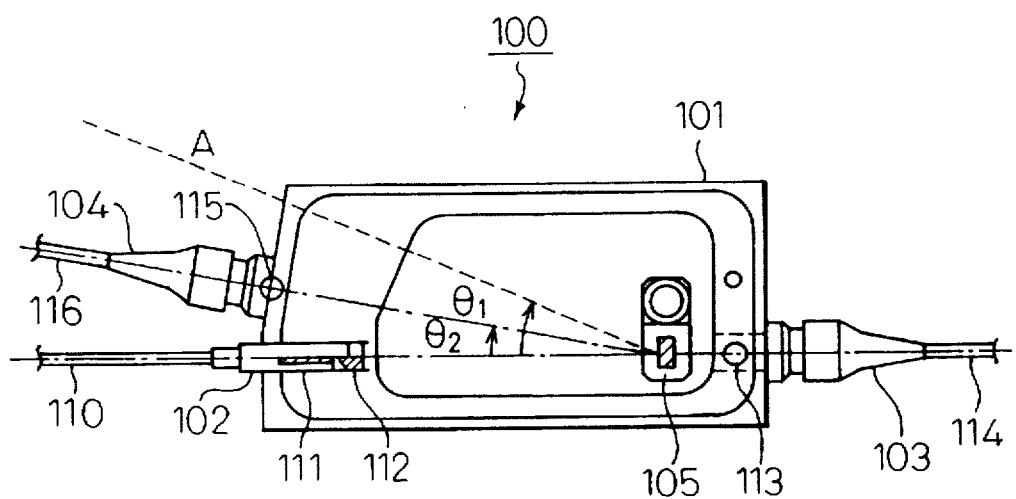
FIG. 5 a view of the optical device of the prior art.

FIG. 4 shows the optical device according to the fourth embodiment of the present invention. The elements similar to those of the embodiment of FIG. 2 are shown by the identical reference numerals. That is, the optical device comprises a first optical fiber 1, a lens 2, an optical thin film 3, a condensing lens 4, a second optical fiber 6, and a third optical fiber 5. The first optical fiber 1 and the second optical fiber 6 are secured by the support dies 1—1 and 6-1. The lens 2 is secured by the support die 2-1 in the casing 50, the optical thin film 3 is secured by the support die 3-1, and the third optical fiber 5 and the condensing lens 4 are supported by the support die 4-1. A triangular block 7 is provided to move the support dies 1—1 and 6-1. A detailed description of these elements are omitted here.

In FIG. 4, a micrometer 11 is fixed to the casing 50 to move the triangular block 7. The micrometer 11 comprises a movable part 11-1, a support die 11-2 for fixing the micrometer 11 to the casing 50, and a drum 11-3. The triangular block 7 is fixed to a support die 7-1 which is supported by the movable part 11-1 of the micrometer 11. The support die 7-1 is biased by a spring 7-2 toward the support dies 1—1 and 6-1.

Therefore, it is possible to move the triangular block 7 toward and away from the lens 2, by rotating the drum 11-3 of the micrometer 11, to adjust the angles of the light made incident to the optical thin film 3. The spring 7-2 is provided to eliminate any play between the support die 7-1 and the support dies 1—1 and 6-1 and a smooth movement is ensured when the position of the support die 7-1 is changed by the micrometer 11. The position of the triangular block 7 is fixed to avoid any deviation after the incident angle is determined. It will be apparent that the micrometer 11 can be used for moving the triangular prism 9 in the embodiment of FIG. 3.

The optical device according to the present invention is not limited to the illustrated wave coupling and separating device which couples and separates two light components, but it is possible to construct a wave coupling and separating device which couples and separates more than two light components, for example, formed by an arbitrary number of cascaded optical devices. By constructing the optical device in this way, it is possible to construct a multiplex wavelength communication system using a plurality of light components having different wavelengths in which the manner of coupling and separating light components can be changed, increased and decreased as will.

It is also possible to construct an optical amplifier, by using the optical device, for separating a multiplex light comprising two light components into simplex light components, for coupling simplex light components into a multiplex light comprising two light components, and for amplifying a multiplex light and each simplex light component.

It is also possible to construct an optical communication system, by using the optical device and the optical amplifier, for separating multiplex two-light components into simplex light components, for coupling simplex light components into multiplex two-light components, and for carrying out an optical communication with multiplex two light components and simplex light components.

As explained in greater detail, it is possible to obtain an optical device including an optical thin film comprising a band-pass filter having a narrow passing region in which the distance between the wavelengths is narrow, which device can be fabricated in a smaller size even if the incident angle is smaller to mitigate dependence on polarization of light.

We claim:

1. An optical device comprising:

a lens having an optical axis and a focal point;

first and second parallel optical fibers arranged on one side of the lens at symmetrical positions with respect to the optical axis;

a first support element for supporting the first optical fiber;

a second support element for supporting the second optical fiber;

an optical thin film arranged on the other side of the lens at a position of the focal point of the lens and perpendicular to the optical axis;

a third optical fiber arranged on the opposite side of the lens from the optical thin film at a position on an optical path passing through the first optical fiber, the lens and the optical thin film;

a third support element for supporting the third optical fiber; and whereby two light components can be transmitted through the first optical fiber, one of the two light components can be reflected by the optical thin film toward the second optical fiber and be transmitted through the second optical fiber, and the other of the two light components can pass through the optical thin film toward the third optical fiber and be transmitted through the third optical fiber.

2. An optical device according to claim 1, wherein the first and second support elements are movably arranged so that the first and second optical fibers can be moved to symmetrical positions with respect to the optical axis to adjust angles of the transmitted light components made incident to the optical thin film.

3. An optical device according to claim 2, further comprising a moving element which moves the first and second support elements to adjust the angles of the transmitted light components made incident to the optical thin film.

4. An optical device according to claim 3, further comprising a guide to allow the first and second support elements to be moved in the direction parallel to the optical axis of the lens and to restrict the movement of the first and second support elements in the direction along the optical axis of the lens.

5. An optical device according to claim 4, wherein the moving element comprises a triangular block having an isosceles triangular cross section having a central axis, the moving element being movable with the central axis thereof in alignment with the optical axis of the lens so that the first and second support elements are moved equidistantly from the optical axis of the lens.

6. A optical device according to claim 3, further comprising a micrometer to move the moving element.

7. An optical device according to claim 1, further comprising a condensing lens between said lens and the third optical fiber.

8. An optical device according to claim 7, wherein the condensing lens and the third optical fiber are supported by a common support element.

9. An optical amplifier including an optical device according to claim 1, for separating a multiplex light comprising two light components into simplex light components, for coupling,simplex light components into a multiplex light comprising two light components, and for amplifying a multiplex light and each simplex light component.

10. An optical communication system including an optical device according to claim 1 for separating a multiplex light comprising two light components into simplex light components, for coupling simplex light components into a multiplex light comprising two light components, and for carrying out an optical communication with multiplex two-light components and simplex light components.

11. An optical device comprising:

a lens having an optical axis and a focal point;

first and second optical fibers arranged on one side of the lens perpendicular to the optical axis of the lens at symmetrical positions with respect to the optical axis in a mutually facing relationship;

an optical thin film arranged on the other side of the lens at a position of the focal point of the lens and perpendicular to the optical axis;

a movable block having a central axis and two oblique surfaces symmetrically extending with respect to the central axis thereof, the oblique surfaces being reflecting surfaces, the movable block being movable with the central axis thereof in alignment with the optical axis of the lens to adjust angles of the transmitted light components made incident to the optical thin film;

a third optical fiber arranged on the opposite side of the lens from the optical thin film at a position on an optical path passing through the first optical fiber, the reflecting surface, the lens and the optical thin film; and whereby two light components can be transmitted through the first optical fiber, one of the two light components can be reflected by the optical thin film toward the second optical fiber and be transmitted, through the second optical fiber, and the other of the two light components can pass through the optical thin film toward the third optical fiber and be transmitted through the third optical fiber.

12. An optical device according to claim 11, further comprising a condensing lens between said lens and the third optical fiber.

13. An optical device according to claim 11, wherein the condensing lens and the third optical fiber are supported by a common support element.

14. An optical device according to claim 11, wherein the movable block comprises a triangular prism.

15. An optical device according to claim 11, further comprising a micrometer to move the movable block.

16. An optical amplifier including an optical device according to claim 11 for separating a multiplex light comprising two light components into simplex light components, for coupling simplex light components into a multiplex light comprising two light components, and for amplifying the multiplex light and each simplex light component.

17. An optical communication system including an optical device according to claim 11 for separating multiplex two-light components into simplex light components, for coupling simplex light components into multiplex two-light components, and for carrying out an optical communication with multiplex two-light components and simplex light components.

18. An optical device comprising:

a lens having an optical axis;

a first optical fiber arranged on one side of the lens to define a first optical path through the lens;

a second optical fiber arranged on one side of the lens to define a second optical path through the lens, the first and second optical fibers being arranged at symmetrical positions with respect to the optical axis; the first optical path intersecting the second optical path at an intersecting position on the other side of the lens;

an optical thin film arranged on the other side of the lens at the intersecting position perpendicular to the optical axis;

a third optical fiber arranged on the opposite side of the lens from the optical thin film at a position on the first optical path; and whereby two light components can be transmitted through the first optical fiber, one of the two light components can be reflected by the optical thin film toward the second optical fiber and be transmitted through the second optical fiber, and the other of the two light components can pass through the optical thin film toward the third optical fiber and be transmitted through the third optical fiber.

* * * * *

UNITED STATES PATENT AND TRADEMARK OFFICE
CERTIFICATE OF CORRECTION

PATENT NO.:    5,796,887
DATED      :   August 18, 1998
INVENTOR(S):   Norihisa NAGANUMA et al.

It is certified that error appears in the above-identified patent and that said Letters Patent is hereby corrected as shown below:

Col. 4,    line 41, after "reference" insert --to--.

Col. 5,    line 25, delete "is".

Signed and Sealed this

Fifth Day of January, 1999

Attest:

Attesting Officer

*Acting Commissioner of Patents and Trademarks*